(12) United States Patent
Delius

(10) Patent No.: US 6,919,112 B2
(45) Date of Patent: Jul. 19, 2005

(54) POLYAMIDE-BASED SAUSAGE SKIN WHICH CAN BE FILLED MANUALLY

(75) Inventor: Ulrich Delius, Frankfurt (DE)

(73) Assignee: Kalle Nalo GmbH & Co. KG, Wiesbaden (DE)

( * ) Notice: Subject to any disclaimer, the term of this patent is extended or adjusted under 35 U.S.C. 154(b) by 0 days.

(21) Appl. No.: 09/284,024

(22) PCT Filed: Oct. 24, 1997

(86) PCT No.: PCT/EP97/05890

§ 371 (c)(1),
(2), (4) Date: Apr. 6, 1999

(87) PCT Pub. No.: WO98/19551

PCT Pub. Date: May 14, 1998

(65) Prior Publication Data

US 2003/0152725 A1 Aug. 14, 2003

(30) Foreign Application Priority Data

Nov. 2, 1996 (DE) .......................... 196 45 276

(51) Int. Cl.⁷ ..................... A22C 13/00; B29C 55/30
(52) U.S. Cl. ............... 428/34.8; 428/474.4; 138/118.1; 426/129; 264/209.5; 264/210.5; 264/235.8; 264/564
(58) Field of Search ............... 428/34.8, 474.4, 428/474.9, 475.8, 476.3, 476.9; 138/118.1; 426/129; 264/209.5, 210.5, 235.8, 564

(56) References Cited

U.S. PATENT DOCUMENTS

| | | | | |
|---|---|---|---|---|
| 3,788,503 A | * | 1/1974 | Hirose et al. ............... 264/95 |
| 4,486,507 A | * | 12/1984 | Schumacher ............. 428/476.1 |
| 4,501,861 A | | 2/1985 | Woodbrey ................. 525/421 |
| 4,560,520 A | | 12/1985 | Erk et al. ..................... 264/22 |
| 4,601,929 A | | 7/1986 | Erk et al. ..................... 428/36 |
| 4,970,274 A | * | 11/1990 | Chacko et al. .............. 525/432 |
| 5,185,189 A | | 2/1993 | Stenger et al. ............. 428/34.8 |
| 5,612,104 A | * | 3/1997 | Grund ........................ 428/348 |
| 5,773,059 A | * | 6/1998 | Delius et al. ............... 426/129 |
| 5,840,807 A | | 11/1998 | Frey et al. .................. 525/178 |
| 5,936,044 A | | 8/1999 | Melot et al. | |

FOREIGN PATENT DOCUMENTS

| | | |
|---|---|---|
| DE | 28 50 182 | 6/1980 |
| EP | 0 116 288 | 8/1984 |
| EP | 0 473 091 | 3/1992 |
| EP | 0 476 963 B2 | 3/1992 |
| EP | 0 560 630 B1 | 9/1993 |
| EP | 0 573 306 | 12/1993 |
| EP | 0 467 039 B1 | 8/1995 |
| EP | 0 737 709 | 10/1996 |
| EP | 0 737 709 A1 | 10/1996 |
| GB | 2 035 198 | 6/1980 |
| JP | 4-314741 A | 11/1992 |
| WO | WO 96/17003 | 6/1996 |

OTHER PUBLICATIONS

Mark Alger, Polymer Science Dictionary, $2^{nd}$ Edition, 1997.*

* cited by examiner

*Primary Examiner*—Harold Pyon
*Assistant Examiner*—Sow-Fun Hon
(74) *Attorney, Agent, or Firm*—Foley & Lardner LLP

(57) ABSTRACT

The invention concerns a biaxially stretched and thermoset tubular seamless single- or multi-layered foodstuff skin wherein the layer, or, a multi-layered skin wherein at least one of the layers, contains a block copolymer with "hard" aliphatic polyamide blocks and "soft" aliphatic polyether blocks, the block copolymer corresponding to one of formulae (I) to (III), $E_a-(NH-[CH_2]_x-CO)_m-X_a-(A-O)_n-A$ $X_a-(CO-[CH_2]_x-NH)_m-E_a$ (I), (II), $-[X-(CO-[CH_2]_x-NH)_o-Y-X-(A-O)_p-A]-(III)$. The invention is particularly suitable as a skin for a sausage which is to be boiled or heated in water, and does not form folds when the filling is introduced manually, with no or only slight pressure.

15 Claims, No Drawings

US 6,919,112 B2

POLYAMIDE-BASED SAUSAGE SKIN WHICH CAN BE FILLED MANUALLY

This application is a 371 of PCT/EP97/05890 filed Oct. 24, 1997.

BACKGROUND OF THE INVENTION

The present invention relates to a polyamide-based sausage casing. It is contemplated, in particular, for sausage production on a relatively small scale in which stuffing is performed not automatically, but manually. The casing is especially suitable for cooked-meat sausages and scalded-emulsion sausages.

Fiber-reinforced cellulose casings which are produced by the viscose process and are provided with a water-impermeable inner coating have the largest share in the production of cooked-meat sausages and scalded-emulsion sausages. They are followed in second place by the casings made of thermoplastics, in particular of polyamide or vinylidene chloride copolymers. For sausage production on an artisanal scale, the internally-coated fiber-reinforced cellulose casings are considerably better suited than the thermoplastic casings.

Cooked-meat sausages and scalded-emulsion sausages are, after stuffing, scalded in water or steam at about 80° C., occasionally also at from 110 to 130° C. In the course of this the volume of the sausage-meat emulsion increases. On cooling it then markedly decreases again. The sausage casing must adapt itself to the changing volume of the sausage-meat emulsion. In particular, the sausage casing is to contract on cooling to the extent that no wrinkles are formed. This is because sausage having a wrinkled casing is generally regarded as "no longer fresh". Furthermore, the casing should have sufficient tension that no liquid collects under it after the scalding. A "gel deposit" of this type between casing and emulsion is likewise considered a quality defect.

Said internally-coated cellulose casings are usually softened prior to stuffing. In this process, the highly hygroscopic cellulose is saturated with water. The water absorption is generally from 110 to 140% by weight. At the same time the casing swells and becomes highly supple. In this state, it is stuffed with the emulsion. After the scalding and cooling, the sausage is dried. In the course of this, the casing releases again the majority of the absorbed water. However, because of the impermeable inner coating, virtually no moisture can escape from the sausage-meat emulsion. During the drying, the cellulose layer contracts greatly, so that the casing tightly encloses the cooled sausage-meat emulsion. Wrinkles and gel deposit are thus prevented, even if the emulsion—as is usual with manual stuffing—was stuffed under no external pressure or at only a low pressure.

As regards their service properties, the internally coated cellulose casings are ideal for manual stuffing. However, a disadvantage with these casings is the complex and expensive production by the viscose process. In this process, a cellulose xanthogenate solution is firstly applied to the fiber reinforcement which has been preshaped to form a tube. The cellulose xanthogenate is then precipitated in dilute sulfuric acid and regenerated to form cellulose hydrate. After washing and drying the casing, a polymer dispersion is applied to its inside, which polymer dispersion then gives the water-impermeable coating.

In contrast, cooked-meat sausage casings and scalded-emulsion sausage casings may be produced much more simply and inexpensively by extrusion blow-moulding of thermoplastics. Casings of biaxially stretched polyamide have achieved some importance here. Thus, DE-A 28 50 182 (=GB-A 2 035 198) describes a single-layer biaxially stretched casing of an aliphatic polyamide whose glass transition point in the dry state is at least 48° C. and which may be decreased after water absorption to at least 3° C., preferably to −5° C. Polyamides which are specifically disclosed are nylon 6 (=polycaprolactam), nylon 7, nylon 6,6 (=polyamide of hexamethylenediamine and adipic acid), nylon 6,10 (=polyamide of hexamethylenediamine and sebacic acid). According to DE-A 28 50 181, the casing additionally comprises an ionomer resin, a modified ethylene-vinyl acetate copolymer and/or a quaternary copolymer containing units of ethylene, butylene, an aliphatic ethylenically unsaturated ($C_3$–$C_5$)carboxylic acid and an ester of this carboxylic acid with a ($C_1$–$C_8$)alkanol. This casing, after the initial cutting of the sausage, shows a reduced tendency to tear propagation. The polyamide casing according to DE-A 32 27 945 (=U.S. Pat. Nos. 4,560,520 and 4,601,929) is said to have the same advantage.

EP-A 0 065 278 discloses a single- or multilayer, shrinkable flat film in which the layer or at least one layer consists of polyamide. The polyamide layer comprises a linear aliphatic (co-)polyamide and a partially aromatic (co-)polyamide. The linear aliphatic (co-)polyamide can be partially or completely replaced by an elastomeric component, such as polybutadiene, polyurethane rubber or nitrile rubber. The film is additionally stretched, but not thermoset, since it is to have a high shrinkability and high shrinkage force. These properties are caused by the special polymer combination in the polyamide layer.

In order that the finished cooked-meat sausages and scalded-emulsion sausages lose as little weight as possible during storage, a permeability to water or water vapor as low as possible is also wanted for the casings made of thermoplastics. However, many polyamides can absorb up to 10% by weight of water. Pure polyamide casings are therefore less suitable. In order to make up for this disadvantage, multilayer casings have been developed which additionally comprise (at least) one layer of a water-vapor-impermeable polymer. Thus, the biaxially stretched casing according to EP-A 573 306 consists of a middle polyamide layer and an inner layer and an outer layer of a water-vapor-barrier polymer, eg. a polyolefin. DE-A 40 17 046 likewise discloses a three-layer biaxially stretched and thermoset casing. Here, the outer layer consists of aliphatic polyamide and/or copolyamide, the middle layer consists of polyolefin and an adhesion-promoting component and the inner layer consists of aliphatic and/or partially aromatic (co-)polyamide.

After heating to temperatures of about 80° C. or above, as are attained on scalding the sausage, the casings begin to shrink. Owing to this thermal shrink, the circumference of the casing generally decreases by from 5 to 20%. The extent of the contraction also depends here on the conditions in the preceding thermosetting. Usually, during the thermosetting a transverse shrinkage of the tube of up to 40% has already taken place. Simultaneously, the diameter of the tube becomes more uniform. On scalding the sausage, the thermal shrinkage begins virtually immediately. This leads to the tension of the casing being greatest at the beginning of the only a relatively low residual elasticity.

In sausage production on an industrial scale, this problem is solved by stuffing the emulsion under high pressure. A stuffing pressure of from 20 to 40 kPa is usual, depending on the caliber of the sausage casing. However, specially constructed stuffing machines are necessary for this. In this manner, a first (partially) elastic extension of the casing is achieved. The elastic force resulting in the course of this is, as is also the thermal shrinkage force, partially diminished during the scalding. The remaining force is then generally just sufficient to ensure tight and wrinkle-free fitting of the casing.

However, without special stuffing machines, a high stuffing pressure cannot be achieved. Manually stuffed polyamide casings are therefore, after the scalding and cooling, generally wrinkled and less attractive. Therefore, in the artisanal sector, the internally-coated cellulose casings described at the outset continue to be used.

SUMMARY OF THE INVENTION

The object was therefore to develop a casing for cooked-meat sausages and scalded-emulsion sausages which can be produced by extrusion blow-molding from thermo-plastics and can be tightly filled without wrinkling even if the emulsion was stuffed without external pressure or at a low pressure, that is by hand and without using special stuffing machines.

The object is achieved by a biaxially stretched and thermoset, tubular, seamless, single-layer or multilayer food casing in which the layer or, in the case of multilayer casings, at least one of the layers comprises a block copolymer containing "hard" aliphatic polyamide blocks and "soft" aliphatic polyether blocks, which block copolymer corresponds to one of the formulae I to III:

$$E_a-(NH-[CH_2]_x-CO)_m-X_a-(A-O)_n-A-X_a-(CO-[CH_2]_x-NH)_m-E_a \quad (I)$$

where

A is an alkanediyl radical of the formula —CH$_2$—CH$_2$— (=ethane-1,2-diyl),
—CH$_2$—CH(CH$_3$)—(=propane-1,2-diyl) or
—(CH$_2$)$_4$—(=butane-1,4-diyl), $X_a$ is —O— or —NH—, $E_a$ is H, (C$_2$-C$_8$)alkanoyl, benzoyl or phenylacetyl,
CO—N([CH$_2$]$_{x-1}$—CH$_3$)—CO—(C$_1$-C$_4$)alkyl,
CO—N([CH$_2$]$_{x-1}$—CH$_3$)—CO—C$_6$H$_5$ or
CO—N([CH$_2$]$_{x-1}$—CH$_3$)—CO—CH$_2$—C$_6$H$_5$, x is an integer from 5 to 11,
m is an integer from 30 to 200 and
n is an integer from 4 to 60;

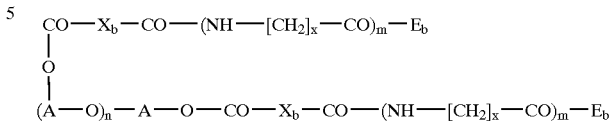

where $X_b$ is an alkanediyl radical of the formula —[CH$_2$]$_z$—, where z is an integer from 4 to 10,
meta- or para-phenylene,
—NH—(C$_1$-C$_6$)alkyl—NH—,
—NH—C$_6$H$_3$—(CH$_3$)—NH—,
>N—[CH$_2$]$_{x-1}$—CH$_3$, —[CH$_2$]$_z$—CO—N([CH$_2$]$_{x-1}$—CH$_3$)— or
—C$_6$H$_4$—CO—N ([CH$_2$]$_{x-1}$—CH$_3$)—,
where C$_6$H$_4$ is meta- or para-phenylene, $E_b$ is —OH, —O—(C$_1$-C$_7$)alkyl, —O-phenyl or

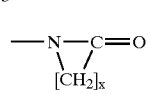

and

A, m and n have the meanings given above;

$$-[X-(CO-[CH_2]_x-NH)_o-Y-X-(A-O)_p-A]- \quad (III)$$

where

Y is —CO—, —CO—[CH$_2$]$_z$—CO— or —CO—C$_6$H$_4$—CO—,
where C$_6$H$_4$ is meta- or para-phenylene, or is
—CO—N([CH$_2$]$_{x-1}$—CH$_3$)—CO—,
—CO—N([CH$_2$]$_{x-1}$—CH$_3$)—CO—[CH$_2$]$_z$—CO—N([CH$_2$]$_{x-1}$—CH$_3$)—CO— or
—CO—N([CH$_2$]$_{x-1}$—CH$_3$)—CO—C$_6$H$_4$—CO—N([CH$_2$]$_{x-1}$—CH$_3$)—CO—,
where C$_6$H$_4$ has the meanings specified, o is an integer from 10 to 150 and
p is an integer from 4 to 100 and
A, x and z have the meanings given above.

DETAILED DESCRIPTION OF THE INVENTION

The "hard" polyamide blocks in the block copolymer of the formulae I to III generally have a glass transition temperature $T_g$ of from 20 to 80° C., while the "soft" polyether blocks have a $T_g$ of from −100 to −20° C. The variable X is preferably 5, ie. the polyamide blocks are preferably polycaprolactam blocks, while A is preferably ethane-1,2-diyl or butane-1,4-diyl, ie. the polyether blocks are preferably poly(ethylene glycol) or poly(butylene glycol) blocks. The block copolymer of formula III in which the hard and soft blocks occur in alternating sequence generally has an average molecular weight $M_w$ of from 20,000 to 70,000.

Of the block copolymers of the formulae I and II, preference is given to those where n=from 40 to 100 and n=from 10 to 40. Of the block copolymers of the formula III, again preference is given to those where o=from 10 to 60 and p=from 20 to 40.

Particular preference is given to block copolymers of the formula I where $X_a$=—NH— and block copolymers of the formula III in which X=—O— and Y=—CO—$[CH_2]_4$—CO— or —CO—$[CH_2]_{10}$—CO—.

The block copolymers of the formulae I, II and III are known as such and are described in U.S. Pat. No. 4,501,861.

In a particular embodiment, this layer further contains at least one aliphatic and/or partially aromatic (co-)polyamide mixed with the block copolymers. Preferred (co-)polyamides of this type are nylon 6, nylon 6/6,6 (=copolyamide of ε-caprolactam, hexamethylenediamine and adipic acid), nylon 6/12 (=copolyamide of ε-caprolactam and ω-laurolactam), nylon 12 (=poly(ω-laurolactam) and nylon 6I/6T (=copolyamide of hexamethylenediamine, isophthalic acid and terephthalic acid). The content of the additional polymers in this layer is up to 85% by weight, based on the total weight of the layer.

The layer having the block copolymers of the formulae I, II and/or III can additionally be colored by the addition of inorganic or organic pigments. Finally, still further additives may be present, in particular antiblock agents and compositions which improve the processing properties.

The food casing according to the invention is produced by extrusion blow-molding. Corresponding processes are familiar per se to those skilled in the art. Generally, in these processes, the polymer (blend) is firstly plasticized to form a homogeneous melt and then extruded through a heated ring die. In this manner, a seamless casing is obtained. The relatively thick tube obtained in the extrusion is firstly rapidly cooled, in order to obtain the polymers in the amorphous state. The tube is then heated to the temperature required for stretching and is stretched by blow-molding. In this process the tube is expanded by the pressure of an internal gas (usually air). The stretched tube is then partially thermoset, so that a residual shrinkage in the range of from 5 to 20% at 80° C. remains. In the course of this, the stretching ratio decreases slightly. The area stretching ratio of the thermoset casing is generally about from 6 to 10.

A casing having somewhat less favorable shrinkage properties and slightly decreased strength is obtained if the tube is blow-molded immediately after leaving the ring die and is then likewise (partially) thermoset. After cooling, the casings are usually flattened and rolled up.

For special applications, eg. when a casing having elevated water-vapor-barrier properties is wanted, multilayer casings are advantageous. The additional layers preferably consist of polyamides (eg. nylon 6) or polyolefins (eg. polyethylene or polypropylene). The polyolefins in this case can also bear adhesion-promoting functional groups. Furthermore, the additional layers can consist of (co-)polymers containing units of ethylenically unsaturated monomers (eg. vinyl acetate, vinyl alcohol or (meth)acrylic acid, of vinylidene chloride copolymers or acrylonitrile copolymers, of ionomer resins or mixtures of said (co)polymers.

In the case of the two-layer casing according to the present invention, the additional layer is preferably on the inside. If the casing according to the invention has three layers, the outer layer preferably comprises the block copolymers of the formulae I, II and/or III. The multilayer casing according to the invention usually comprises no more than 5 layers.

The multilayer casings are generally produced by coextrusion. The coextrusion dies, with increasing number of the layers to be extruded, become technically more and more complex and costly, which limits the number of layers. Blow-molding and (partial) thermosetting then follow, as described above.

The casing according to the invention exhibits a high shrinkage under the conditions which are generally reached in the scalding of cooked-meat sausage and scalded-emulsion sausage. The casing has roughly "rubber-like" resilience properties. The sausages produced therewith—without the use of stuffing machines—are, after scalding and cooling, tightly-filled and wrinkle-free.

In the examples below, pw is parts by weight. Percentages, unless stated otherwise, are percentages by weight.

EXAMPLE 1

A blend of 70 pw of nylon 6 (the relative viscosity of a 1% strength solution of the polyamide in 96% strength sulfuric acid was 4) and 30 pw of a block copolymer containing poly(propylene glycol) blocks and polycaprolactam blocks (®Grilon ELX 2112 from Ems-Chemie AG), whose melting point was 209° C. (determined by DSC=differential scanning calorimetry)

was plastified in a single-screw extruder at 240° C. to form a homogeneous melt and extruded through a ring die to form a tube having a diameter of 18 mm. The tube was cooled rapidly, then brought to the temperature required for stretching, stretched by blow-molding and finally thermoset, in which case the stretching ratio decreased by 5% in the transverse direction, while it remained unchanged in the longitudinal direction. The area stretching ratio was 8.7. The finished casing had a diameter of 60 mm.

EXAMPLE 2

A blend of 50 pw of nylon 6 (as in Example 1), 30 pw of a block copolymer of poly(butane-1,4-diol) blocks and polylaurolactam blocks (®Pebax 5533 SN01 from Elf Atochem S.A.), which had a melt flow index of 5 g/10 min at 235° C. and 1 kg load, and 20 pw of nylon 6/12 (®Grilon CF6S from Ems Chemie AG), which had a melt flow index of 50 g/10 min at 190° C. and 10 kg load, was, as described in Example 1, extruded to form a tube having a diameter of 19 mm, stretched and thermoset. The area stretching ratio was 8.3. The finished sausage casing again had a diameter of 60 mm.

EXAMPLE 3

To produce a three-layer sausage casing, the following blends were prepared:

Blend A:

90 pw of nylon 6 (as in example 1) and 10 pw of the block copolymer also used in Example 1;

Blend B:

70 pw of LDPE (low density polyethylene), which had a melt flow index of 0.2 g/10 min at 190° C. and 2.16 kg load (®Lupolen 2441D from BASF AG), and 30 pw of LLDPE (linear low density polyethylene) which, by modification with maleic anhydride, had been finished to be adhesion-promoting with respect to polyamide and had a melt flow index of 3 g/10 min at 190° C. and 2.16 kg load (®Escor CTR 2000 from Exxon);

Blend C:

85 pw of nylon 6 (as in Example 1) and 15 pw of amorphous nylon 6I/6T, which had a melt flow index of 90 g/10 min at 275° C. and 10 kg load (®Selar PA 3426 from Du Pont de Nemours Inc.).

The blends were plasticized to form homogeneous melts in three single-screw extruders at 240° C. in each case, then brought together in a three-layer ring die and coextruded to form a three-layer tube having a diameter of 29 mm. The tube was then, as described, stretched and thermoset. During thermosetting, the transverse stretching ratio decreased by 20%. The area stretching ratio was 8.7 after this. The diameter of the finished sausage casing was 80 mm. Total wall thickness of the casing was 54 μm. In this, the outer layer (from blend A) had a thickness of 34 μm, the middle layer (from blend B) of 16 μm and the inner layer (from blend C) of 4 μm.

EXAMPLE 4

Example 3 was repeated with the single change that, instead of the blend A used there, a blend A of 70 pw of nylon 6 (as in Example 1) and 30 pw of the block copolymer according to Example 1 was used.

As described in Example 3, a three-layer tube having a diameter of 28 mm was coextruded, stretched and thermoset. The area stretching ratio was 9. The diameter of the finished casing was 80 mm. At a total casing wall thickness of 51 μm, the outer layer (from blend A) had a thickness of 30 μm, the middle layer (from blend B) had a thickness of 15 μm and the inner layer (from blend C) had a thickness of 6 μm.

EXAMPLE 5

Example 3 was repeated with the single change that, instead of the blend A used there, a blend A of 65 pw of nylon 6 (as in Example 1), 20 pw of the block copolymer also used in Example 2 and 15 pw of nylon 6/12 (as in Example 2)

was used. The diameter of the finished casing was 80 mm, its area stretching ratio was 7.9. At a total casing wall thickness of 56 μm, the outer layer (from blend A) had a thickness of 35 μm, the middle layer (from blend B) had a thickness of 15 μm and the inner layer (from blend C) had a thickness of 6 μm.

EXAMPLE 6

Example 3 was repeated with the single change that instead of the blend A used there, a blend A of 50 pw of nylon 6 (as in Example 1), 30 pw of the block copolymer also used in Example 2 and 20 pw of nylon 6/12 (as in Example 2)

was used. The diameter of the finished casing was 80 mm.

The area stretching ratio was 9.0. At a total casing wall thickness of 52 μm, the outer layer (from blend A) had a thickness of 32 μm, the middle layer (from blend B) had a thickness of 14 μm and the inner layer (from blend C) had a thickness of 6 μm.

COMPARISON EXAMPLE 1

In accordance with DE-A 28 50 182, the nylon 6 also used in Example 1 was extruded by the process specified there to form a tube having a diameter of 19 mm which was then stretched and thermoset as described. The area stretching ratio of the finished casing was 8.3, and its diameter was 60 mm.

COMPARISON EXAMPLE 2

In accordance with DE-A 40 17 046,

Component A: nylon 6 (as in Example 1),

Blend B: identical to blend B in Example 3 and

Blend C: identical to blend C in Example 3 were, as described there, coextruded to form a tube having a diameter of 29 mm, stretched and thermoset. During the thermosetting, the transverse stretching ratio decreased by 20%. The area stretching ratio of the finished casing was 7.9, and its diameter was 52 mm. At a total casing wall thickness of 52 μm, the outer layer (from component A) had a thickness of 31 μm, the middle layer (from blend B) had a thickness of 13 μm and the inner layer (from blend C) had a thickness of 8 μm.

The measurements in the table below show the superiority of the casing according to the invention in comparison with those known from the prior art. In the table:

1) denotes measured as specified in DIN 53 455 on a 15 mm wide strip, which was treated with water for 30 min, at a clamping distance of 50 mm;

2) designates the tensile stress which must be applied in the test as specified in DIN 53 455 to extend by 5% the 15 mm wide strip, which was treated with water for 30 min, at the clamping distance of 50 mm and a rate of elongation of 50 mm/min;

3) denotes the percentage increase of the outer circumference of tube sections, which were treated in advance with water for 30 min and have then been inflated to achieve the specified internal pressure;

4) after storage for 15 min in water at 80° C.;

5) the casing was exposed on one side to air having a relative humidity (RH) of 85% at 20° C. The water vapor permeability was measured as specified in DIN 53 122.

6) denotes subjective evaluation of a casing which was treated with water for 30 min. The figures denote: 1=extremely soft; 2=very soft; 3=soft and 4=medium.

7) The casing was stuffed manually with fine-grained scalded-emulsion sausage meat emulsion at a constant low stuffing pressure and closed with metal clips. The sausages were then cooked in a heating cabinet for 60 min at 78° C. and 100% RH. After cooling to 7° C., appearance and consistency were evaluated.

| Example No. | Film thickness in μm | Ultimate tensile stress 1) N/mm² longitudinal | Ultimate tensile stress 1) N/mm² transverse | σ₅ transverse 2) N/mm² | Transverse expansion 3) in % at 15 kPa | Transverse expansion 3) in % at 25 kPa | Shrinkage transverse 4) in % | Water vapor permeability 5) g/m²·day | Flexibility 6) | "Fit" of the casing 7) |
|---|---|---|---|---|---|---|---|---|---|---|
| 1 | 34 | 137 | 135 | 11.3 | 3.6 | 7.0 | 10 | 37.4 | 2 | wrinkle-free tightly filled |
| 2 | 36 | 96 | 89 | 8.2 | 3.4 | 6.5 | 13 | 31.0 | 1 | wrinkle-free tightly filled |
| 3 | 54 | 147 | 143 | 14.0 | 2.8 | 5.4 | 8 | 3.6 | 2 | wrinkle-free tightly filled |
| 4 | 51 | 113 | 111 | 11.5 | 4.1 | 8.0 | 8 | 3.9 | 1 | wrinkle-free tightly filled |
| 5 | 56 | 94 | 96 | 11.9 | 3.3 | 6.2 | 9 | 4.0 | 2 | wrinkle-free tightly filled |
| 6 | 52 | 92 | 88 | 8.0 | 3.7 | 7.2 | 8 | 4.2 | 1 | wrinkle-free tightly filled |
| C1 | 35 | 133 | 177 | 15.1 | 2.3 | 4.8 | 10 | 26.2 | 4 | wrinkled |
| C2 | 52 | 110 | 109 | 14.6 | 2.4 | 5.1 | 8 | 3.8 | 3 | slightly wrinkled |

What is claimed is:

1. A biaxially stretched and thermoset, tubular, seamless, single-layer or a biaxially stretched and thermoset, tubular, seamless, multiple-layer sausage casing having a residual shrinkage in the range of from 5 to 20% at 80° C., wherein the shrinkage is measured before stuffing, in which the layer or, in the case of multiple-layer casings, at least one of the layers comprises a block copolymer containing "hard" aliphatic polyamide blocks having a glass-transition temperature of from 20 to 80° C. and "soft" aliphatic polyether blocks having a glass-transition temperature of from −100 to −20° C., which block copolymer corresponds to the following formula

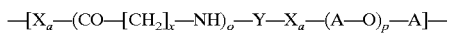
$$-[X_a-(CO-[CH_2]_x-NH)_o-Y-X_a-(A-O)_p-A]-$$

where

Y is —CO—, —CO—[CH₂]_z—CO— or —CO—C₆H₄—CO—,
where C₆H₄ is meta- or para-phenylene, or is
—CO—N([CH₂]_{x−1}—CH₃)—CO—,
—CO—N([CH₂]_{x−1}—CH₃)—CO—[CH₂]_z—CO—N([CH₂]_{x−1}—CH₃)—CO— or
—CO—N([CH₂]_{x−1}—CH₃)—CO—C₆H₄—CO—N([CH₂]_{x−1}—CH₃)—CO—,
where C₆H₄ is para or meta phenylene,
o is an integer from 10 to 150 and
p is an integer from 4 to 100 and
X_a is —O—,
A is an alkanediyl radical of the formula
—CH₂—CH₂—(=ethane-1,2-diyl),
—CH₂—CH(CH₃)—(=propane-1,2-diyl) or
—(CH₂)₄—(=butane-1,4-diyl),
x is an integer from 5 to 11, and
z is an integer from 4 to 10.

2. The food casing as claimed in claim 1, wherein the polyamide blocks are polycaprolactam blocks and the polyether blocks are poly(ethylene glycol) or poly(butylene glycol) blocks.

3. The food casing as claimed in claim 1, wherein, in the block copolymers, o is from 10 to 60 and p is from 20 to 40.

4. The food casing as claimed in claim 1, wherein the layer comprises at least one aliphatic and/or partially aromatic (co-)polyamide, mixed with the remaining constituents.

5. The food casing as claimed in claim 4, wherein the (co-)polyamide is nylon 6, nylon 6/6,6, nylon 6/12, nylon 12 or nylon 6I/6T.

6. The food casing as claimed in claim 4, wherein the proportion of the (co-)polyamide is up to 85% by weight, based on the total weight of the layer.

7. The food casing as claimed in claim 1, wherein the layer comprises inorganic or organic pigments.

8. The food casing as claimed in claim 1, which consists of multiple layers and the further layers consist of polyamides or polyolefins.

9. The food casing as claimed in claim 1, which has been stretched by blow-molding and extruded through a heated ring die.

10. The food casing as claimed in claim 1, which has an area stretching ratio of from about 6 to 10.

11. A process for producing a biaxially stretched and thermoset, tubular, seamless, single-layer or a biaxially stretched and thermoset, tubular, seamless, multiple-layer sausage casing having a residual shrinkage in the range of from 5 to 20% at 80° C., wherein the shrinkage is measured before stuffing, in which the layer or, in the case of multiple-layer casings, at least one of the layers comprises a block copolymer containing "hard" aliphatic polyamide blocks having a glass-transition temperature of from 20 to 80° C. and "soft" aliphatic polyether blocks having a glass-transition temperature of from −100 to −20° C., which block copolymer corresponds to the following formula:

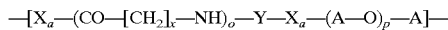

where
Y is —CO—, —CO—[CH$_2$]$_z$—CO— or —CO—C$_6$H$_4$—CO—,
where C$_6$H$_4$ is meta- or para-phenylene, or is
—CO—N([CH$_2$]$_{x-1}$—CH$_3$)—CO—,
—CO—N([CH$_2$]$_{x-1}$—CH$_3$)—CO—[CH$_2$]$_z$—CO—N([CH$_2$]$_{x-1}$—CH$_3$)—CO— or
—CO—N([CH$_2$]$_{x-1}$—CH$_3$)—CO—C$_6$H$_4$—CO—N([CH$_2$]$_{x-1}$—CH$_3$)—CO—,
where C$_6$H$_4$ is para or meta phenylene,
o is an integer from 10 to 150 and
p is an integer from 4 to 100 and
X$_a$ is —O—,
A is an alkanediyl radical of the formula
—CH$_2$—CH$_2$—(=ethane-1,2-diyl),
—CH$_2$—CH(CH$_3$)—(=propane-1,2-diyl) or
—(CH$_2$)$_4$—(=butane-1,4-diyl),
x is an integer from 5 to 11, and
z is an integer from 4 to 10
wherein said process comprises:
preparing a homogeneous melt of a polymer blend containing the block copolymer;
extruding the melt through a heated ring die to form a seamless tube;
stretching the extruded casing by blow molding to form a stretched tube;
partially thermosetting the stretched tube to form the single or multilayer food casing.

12. A process according to claim 11, further comprising rapidly cooling the seamless tube after extrusion to obtain the polymers in an amorphous state, and heating the cooled tube to a blow molding temperature.

13. A process according to claim 11, wherein the step of extruding the melt through a heated ring die to obtain a seamless tube, further comprises coextruding the polymer blend and another polymer blend through a coextrusion die to obtain a multilayer seamless tube.

14. A biaxially stretched and thermoset, tubular, seamless, single-layer or a biaxially stretched and thermoset, tubular, seamless, multiple-layer sausage casing having a residual shrinkage in the range of from 5 to 20% at 80° C., wherein the shrinkage is measured before stuffing, in which the layer or, in the case of multiple-layer casings, at least one of the layers comprises a block copolymer containing "hard" aliphatic polyamide blocks having a glass-transition temperature of from 20 to 80° C. and "soft" aliphatic polyether blocks having a glass-transition temperature of from −100 to −20° C., which block copolymer corresponds to the following formula

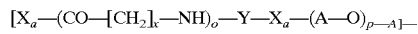

where
Y is —CO—, —CO—[CH$_2$]$_z$—CO— or —CO—C$_6$H$_4$—CO—,
where C$_6$H$_4$ is meta- or para-phenylene, or is
—CO—N([CH$_2$]$_{x-1}$—CH$_3$)—CO—,
—CO—N([CH$_2$]$_{x-1}$—CH$_3$)—CO—[CH$_2$]$_z$—CO—N([CH$_2$]$_{x-1}$—CH$_3$)—CO— or
—CO—N([CH$_2$]$_{x-1}$—CH$_3$)—CO—C$_6$H$_4$—CO—N([CH$_2$]$_{x-1}$—CH$_3$)—CO—,
where C$_6$H$_4$ is para or meta phenylene,
o is an integer from 10 to 150 and
p is an integer from 4 to 100 and
X$_a$ is —O—,
A is an alkanediyl radical of the formula
—CH$_2$—CH$_2$—(=ethane-1,2-diyl),
—CH$_2$—CH(CH$_3$)—(=propane-1,2-diyl) or
—(CH$_2$)$_4$—(=butane-1,4-diyl),
x is an integer from 5 to 11, and
z is an integer from 4 to 10,
wherein the product is produced by a process comprising:
preparing a homogeneous melt of a polymer blend containing the block copolymer;
extruding the melt through a heated ring die to form a seamless tube;
rapidly cooling the seamless tube after extrusion to obtain the polymers in an amorphous state, and heating the cooled tube to a blow molding temperature;
stretching the extruded casing by blow molding to form a stretched tube;
partially thermosetting the stretched tube to form the single or multilayer food casing.

15. A casing according to claim 14, wherein the step of extruding the melt through a heated ring die to obtain a seamless tube, further comprises coextruding the polymer blend and another polymer blend through a coextrusion die to obtain a multilayer seamless tube.

* * * * *